(12) United States Patent
Schwärzler et al.

(10) Patent No.: US 6,319,133 B1
(45) Date of Patent: Nov. 20, 2001

(54) CONSTANT VELOCITY UNIVERSAL JOINT

(75) Inventors: Peter Schwärzler, Glattbach; Friedhelm John, Obertshausen, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/367,965

(22) PCT Filed: Jan. 24, 1998

(86) PCT No.: PCT/EP98/00397

§ 371 Date: Nov. 15, 1999

§ 102(e) Date: Nov. 15, 1999

(87) PCT Pub. No.: WO98/37336

PCT Pub. Date: Aug. 27, 1998

(30) Foreign Application Priority Data

Feb. 21, 1997 (DE) .............................. 197 06 864

(51) Int. Cl.[7] .................................... F16D 3/223
(52) U.S. Cl. ............................. 464/145; 464/906
(58) Field of Search .................... 464/141, 142, 464/143, 145, 146, 906

(56) References Cited

U.S. PATENT DOCUMENTS 4,185,476 * 1/1980 Krude .................................. 464/145
4,459,122 * 7/1984 Rehfeld ........................... 464/906 X
5,376,052   12/1994 Jacob et al. .

FOREIGN PATENT DOCUMENTS

| 42 08 786 C1 | 7/1993 | (DE) . | |
|---|---|---|---|
| 43 02 432 A1 | 8/1993 | (DE) . | |
| 42 30 639 C1 | 10/1993 | (DE) . | |
| 2 081 748 | 3/1996 | (ES) . | |
| 2 115 520 A * | 9/1983 | (GB) | .............................. 464/145 |
| 54-125342 | 9/1979 | (JP) . | |

* cited by examiner

*Primary Examiner*—Lynne H. Browne
*Assistant Examiner*—Greg Binda

(57) ABSTRACT

A constant velocity universal joint for transmitting torque, having an outer joint part with outer ball tracks, an inner joint part with inner ball tracks, torque transmitting balls guided by pairs of outer and inner ball tracks positioned in corresponding meridian planes, and a ball cage which receives the balls in circumferentially distributed windows and holds same in a common plane and guides same on to the angle-bisecting plane when the joint is ariculated, with the center lines of the outer and inner ball tracks being composed of at least two differently curved portions adjoining one another, with the center lines of the ball tracks of the outer joint part each comprising convexly curved inner portions and, towards the open end, concavely curved end portions.

9 Claims, 3 Drawing Sheets

CONSTANT VELOCITY UNIVERSAL JOINT

BACKGROUND OF THE INVENTION

Description

The invention relates to a constant velocity universal joint for transmitting torque, having an outer joint part with outer ball tracks, an inner joint part with inner ball tracks, torque transmitting balls guided by pairs of outer and inner ball tracks positioned in corresponding meridian planes, and a ball cage which lodges the balls in circumferentially distributed windows and holds the balls in a common plane and guides the balls on to the angle-bisect-ing plane when the joint is articulated, with the center lines of the outer and inner ball tracks being composed of at least two differently curved portions adjoining one another.

Joints of this type are known as Rzeppa fixed joints (RF) or undercut-free fixed joints (UF). The latter are described in DE-PS 22 52 827. For a certain size of such joints, and especially as regards the axial length of such joints, there exists a mutual interdependence between the maximum articulation angle and the thickness of the shaft to be connected to the inner joint part. On the one hand, the articulation angle is limited in that the balls must be prevented from leaving the track ends, or, to be more precise, as far as edge loads at the track ends are concerned, it has to be ensured that there exists a sufficient safety distance between the point of contact of the ball in the track and the track end edge. Furthermore, the articulation angle is limited by the thickness of the connecting shaft which, upon articulation of the inner joint part, abuts against an inner cone of the outer joint part and thus prevents further articulation. It makes sense to adapt the thickness of the connecting shaft and the shape and position of the inner cone to one another in such a way that said abutment of the connecting shaft coincides with the safety distance between the point of contact of the ball and the track end edge.

Developments in automotive engineering are such that said constant velocity universal joints are expected to have an ever increasing performance, which means that with a predetermined available space and mass, the service life and functional scope have to be increased, or, vice versa, with a predetermined service and functional scope, space and mass have to be reduced.

With prior art joint designs, any improvements on the one side, for example in respect of the articulation angle, can only be achieved by shortening the service life and reducing the breaking strength.

SUMMARY OF THE INVENTION

It is the object of the present invention to provide a joint of the initially mentioned type whose performance is improved in such a way that space and mass can be reduced without adversely affecting the remaining parameters.

In accordance with the invention, the objective is achieved in that the center lines S of the ball tracks of the outer joint part each comprise convexly curved inner portions $S_1$ and, towards the open end, oppositely curved concave first end portions $S_2$ and that the center lines of the ball tracks of the inner joint part each comprise curved outer portions and, towards the base end of the outer joint part, oppositely curved, second end portions wherein the inner portions $S_1$ and the outer portions each extend in a curved way around a center $Z_1$ inside the outer joint part, and the first end portions $S_2$ and the second end portions each extend in a curved way around a center $Z_2$ outside the outer joint part. This means that the inner portions $S_1$ extend at least partially in a curved way around a joint center C and that the first end portions $S_2$ positioned towards the open end are curved in the opposite direction, i.e. outwardly. In general, the result is that the distance of the center lines of the ball tracks in the outer joint part from the axis $A_A$ in the first end portions $S_2$ increases towards the open end of the outer joint part.

The shape of the outer joint part is hence characterised in that the ends of the ball tracks widen and radially move away from one another towards the open end of the outer joint part.

Preferred embodiments of the invention are described in further sub-claims to which special reference is hereby made.

Due to general conditions of symmetry, the ball tracks in the inner joint part widen and move away from one another in an end portion at the axially opposite end, i.e. towards the base of the outer joint part, again with reference to the center lines of the ball tracks whose distance from the axis $A_I$ of the inner joint part is thus greatest at said end.

In accordance with certain lines of curvature, said first end portions $S_2$ can extend as circular arcs for example, but the end portions of the tracks can also extend in straight lines at an angle relative to the longitudinal axis $A_A$.

The effect achieved by the track shape in accordance with the invention consists in that—in contrast to joints in accordance with the state of the art wherein the points of contact of the balls in the tracks are positioned approximately in radial planes extending through the respective centers of the balls—there is achieved an axial distance between the points of contact of the balls in the tracks with reference to the radial planes through the joint centers, with the points of contact being offset towards the central joint plane. In this way, it is possible to achieve improvements regarding the relationships of the parameters of joint length/joint mass, maximum articulation angle and thickness of the connecting shaft. As far as further explanations of the inventive measures and effects are concerened, reference has to be made to the following drawings. In the embodiment illustrated, the inventive joint is shown as a UF joint. However, to put the technical teaching in accordance with the invention into effect, it is not necessary for the ball tracks to be undercut-free.

DETAILED DESCRIPTION OF THE INVENTION

Figure 1:
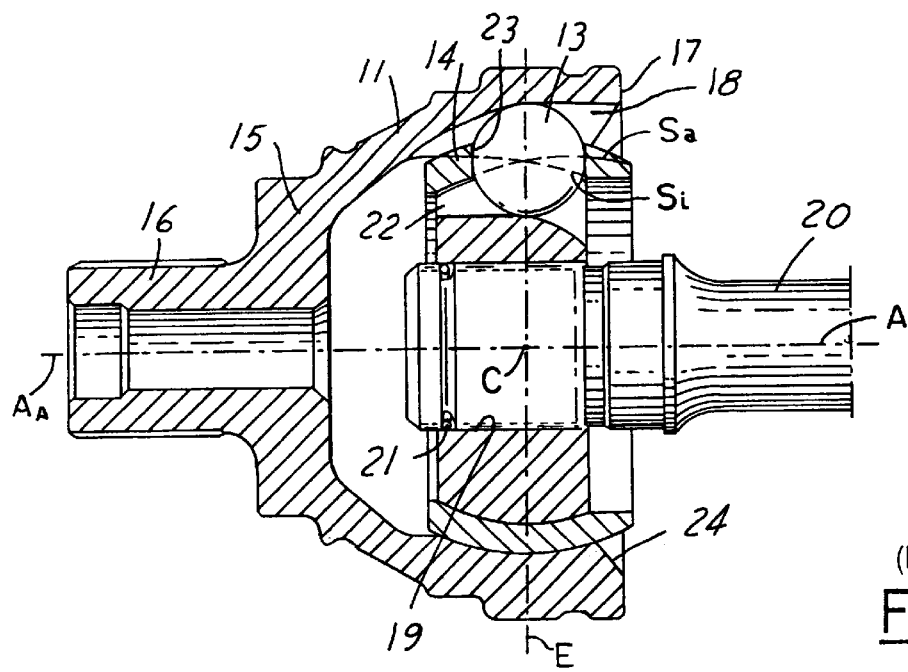
FIG. 1 shows a longitudinal section of an undercut-free constant velocity universal joint (UF joint) according to the state of the art.

FIG. 1 shows a prior art constant velocity universal joint which comprises an outer joint part 11, and inner joint part 12, torque transmitting balls 13 and a ball cage 14. AT one end, the outer joint part 11 is closed by a base 15 which is followed by a joint journal 16. An aperture 17 of the outer joint part 11 is provided axially opposite the base 15. In the outer joint part 11, there is shown one of a plurality of circumferentially distributed outer ball tracks 18 which, if viewed from the open end 17, is undercut-free and has a center line $S_a$. The inner joint part 12 is provided with a central aperture 19 into which there is inserted a connecting shaft 20 which is axially secured by a securing ring 32. In the inner joint part 12, there is shown one of a plurality of circumferentially distributed inner ball tracks 22 which is also undercut-free if viewed from the open end 17 and has a center line $S_i$. Outer ball tracks 18 and inner ball tracks 22 are associated with one another in pairs and jointly accommodate in pairs the torque transmitting balls 13. The balls 13 are jointly held in one plane by the ball cage 14 in that the balls are inserted into the cage windows 23 in the central cage plane which coincides with the central joint plane E. The ball track center lines $S_i$, $S_a$ are parallel to the respective ball track ground lines. Both center lines $S_i$, $S_a$ are symmetrical to one another with respect to plane E.

The central joint plane E also contains the joint center C which is defined by the point of intersection of the axes $A_A$, $A_I$ of the outer joint part and inner joint part when the joint is articulated. At the open end 17 of the outer joint part 1, there is provided an inner cone 24 which forms a stop for the connecting shaft 20 of the inner joint part 12 when the joint is articulated and thus limits the articulation angle β of the joint, as described below.

Figure 2:
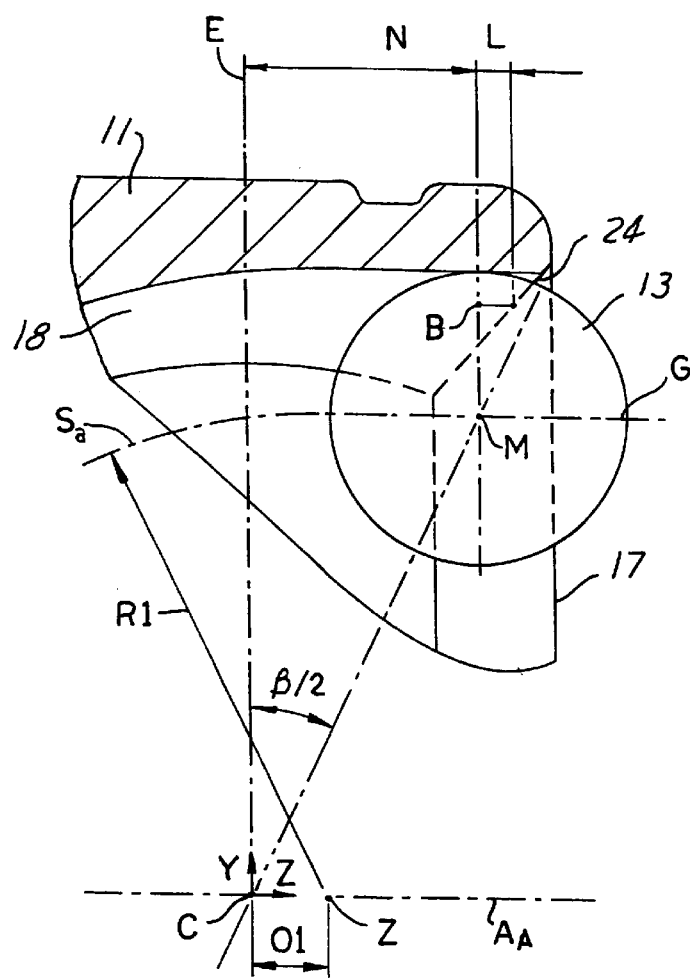
FIG. 2 shows a track run-out of the outer joint part of the joint according to FIG. 1.

FIG. 2 shows the outer joint part 11 with an outer ball track 18 in a broken-away manner. Said inner cone 24 which cuts off the outer ball track 18 at the open end 17 is still visible. Furthermore, there is shown a ball 13 in the ball track 18 in a position which is assumed by the ball 13 when the inner joint part is articulated by its maximum amount relative to the outer joint part. In this case, the maximum articulation angle β between the axes, which will again be referred to below, leads to an articulation angle of the cage relative to the outer joint part of β/2 which is shown in the drawing. By correspondingly articulating the central plane of the cage relative to the central joint plane E, the ball 13, too, is moved out of the central joint plane E by the angle β/2. The center M of the balls follows the dash-dotted central line of the outer ball track 18 which is defined by a circular arc $S_a$ with the radius $R_1$ whose center Z on the axis $A_A$ is offset by the offset $O_1$ relative to the central joint plane E, and by a straight lien G following same tangentially and extending parallel to the axis $A_A$. In the ball position as illustrated, the contact point B of the ball in the outer ball track 18 is positioned in a radial plane through the ball center M. Relative to the track end edge defined by the inner cone 24, the contact point B is at a minimum axial distance L which, in view of possible edge breakages at the track end, must not be allowed to be reduced. The distance between the contact point B and the central joint plane E has been given the reference number N.

Figure 3:
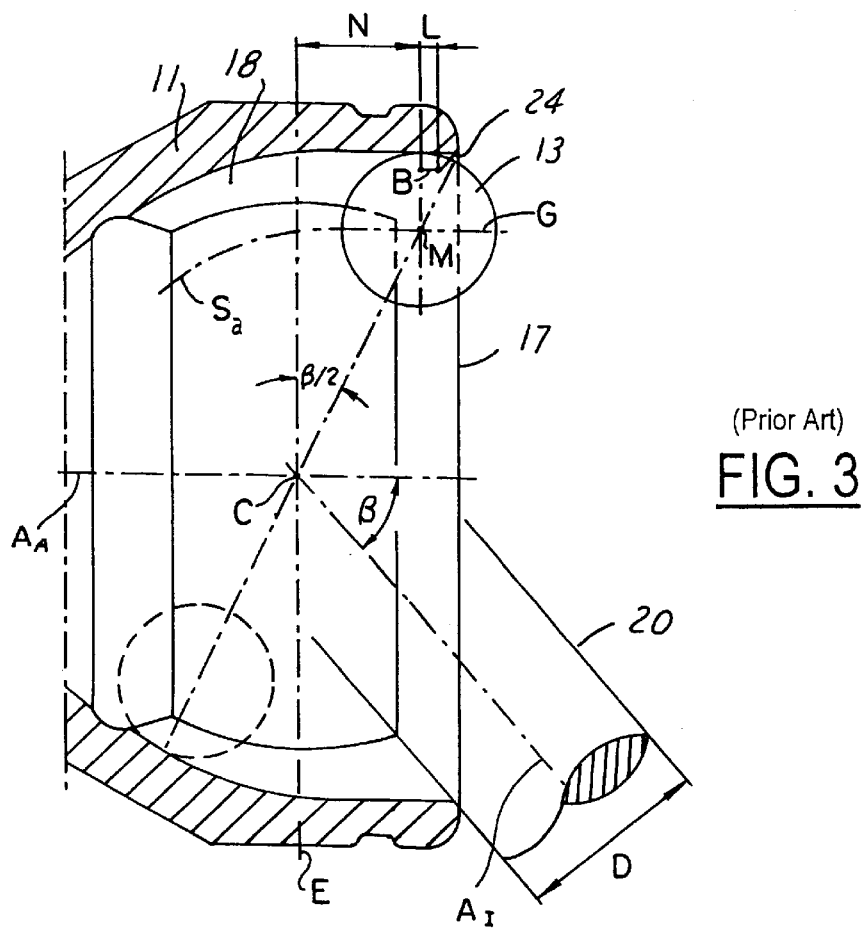
FIG. 3 shows the outer joint part of the joint according to FIG. 1 with an articulated connecting shaft.

FIG. 3 shows the above-mentioned joint articulation angle β between the axis $A_A$ of the outer joint part 11 and the axis $A_I$ of the inner joint part 11 in the joint center C. In this case, the connecting shaft 20 replaces the inner joint part; in this position, it comes to rest against the inner cone 24. By thus limiting the degree of articulation to the angle β, the minimum distance L between the contact point B and the track end edge of the ball track 18 is ensured.

Figure 4:
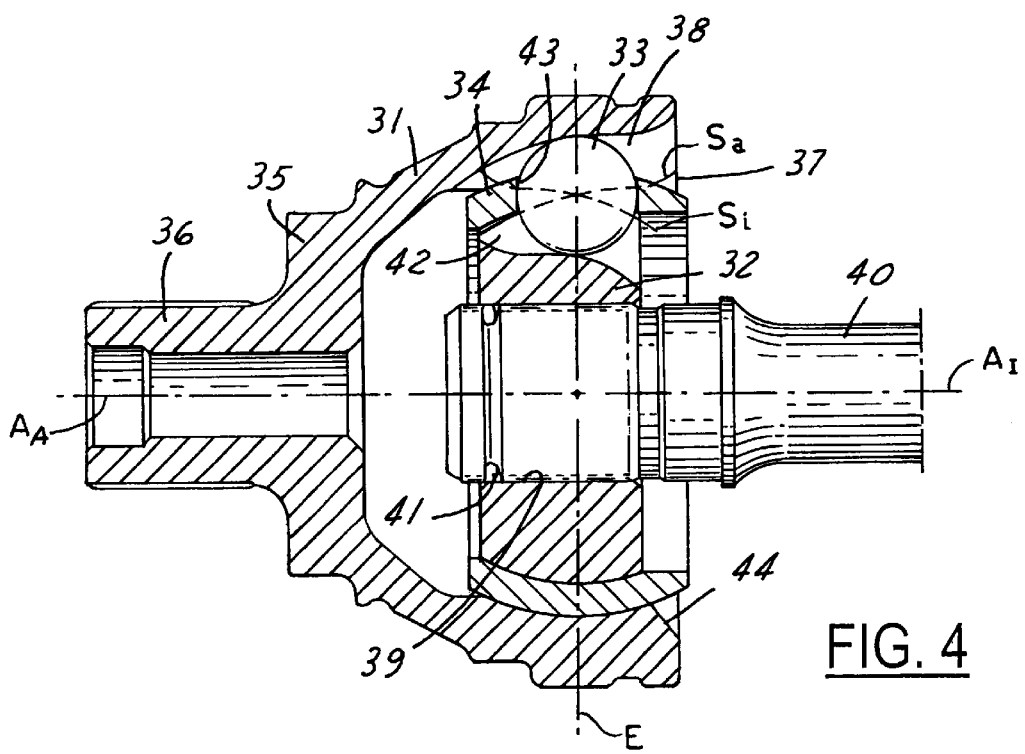
FIG. 4 shows a longitudinal section of an inventive constant velocity universal joint with undercut-free tracks (UF joint).

FIG. 4 shows an inventive constant velocity universal joint which comprises an outer joint part 31, an inner joint part 32, torque transmitting balls 33 and a ball cage 34. At one end, the outer joint part 31 is closed by a base 35 which is followed by a joint journal 36. An aperture 37 of the outer joint part 31 is provided axially opposite the base 35. In the outer joint part 31, there is shown one of a plurality of circumferentially distributed outer ball tracks 38 which, if viewed from the open end 37, are undercut-free, without this being absolutely essential. The inner joint part 32 is provided with a central aperture 39 into which there is inserted a connecting shaft 40 which is axially secured by a securing ring 41. In the inner joint part 32, there is shown one of a plurality of circumferentially distributed inner ball tracks 42 which, with reference to the central joint plane E, extends symmetrically relative to the outer ball track and—if viewed from the open end 37—is undercut-free. Outer ball tracks 38 having center lines $S_a$ and inner ball tracks 42 having center lines $S_i$ are associated with one another in pairs and jointly accommodate the torque transmitting balls 33, wherein each ball is held in the point of intersection of the associated center lines $S_a$, $S_i$. The balls 33 are inserted into cage windows 43 in the central plane of a ball cage 34, which coincides with the central plane E of the joint, and are jointly held in one plane by the ball cage 34. The central joint plane E also contains the joint center C which is defined by the point of intersection of the axes $A_A$, $A_I$ of the outer joint part and inner joint part when the joint is articulated. In the outer joint part, on the side of the open end 37, there is provided an inner cone 44 which can form a stop for the connecting shaft 40 when the joint is articulated. The center lines $S_a$, $S_i$ of the ball tracks 38, 42 which extend parallel to the respective track base and which intersect one another in the center of the ball 33 comprise turning points $T_1$, $T_2$. It is an important aspect that the outer ball tracks 38, towards the open end 37, move away from the longitudinal axis $A_A$, for example in that a center of curvature of the end portion of the center line $S_a$ of the outer ball track 38 is positioned outside the outer joint part 31 and said center line $S_a$ respectively. Accordingly, the inner ball tracks 42, towards the base end 35, move away from the longitudinal axis $A_I$ in that the center of curvature of the end portion of the center line $S_i$ of the inner ball track 42 is positioned outside the inner joint part 32 and said center line $S_i$ respectively. The center lines $S_a$, $S_i$ are each composed of at least two differently curved portions adjoining one another, to be described more detailed with reference to FIGS. 5 and 6.

Figure 5:
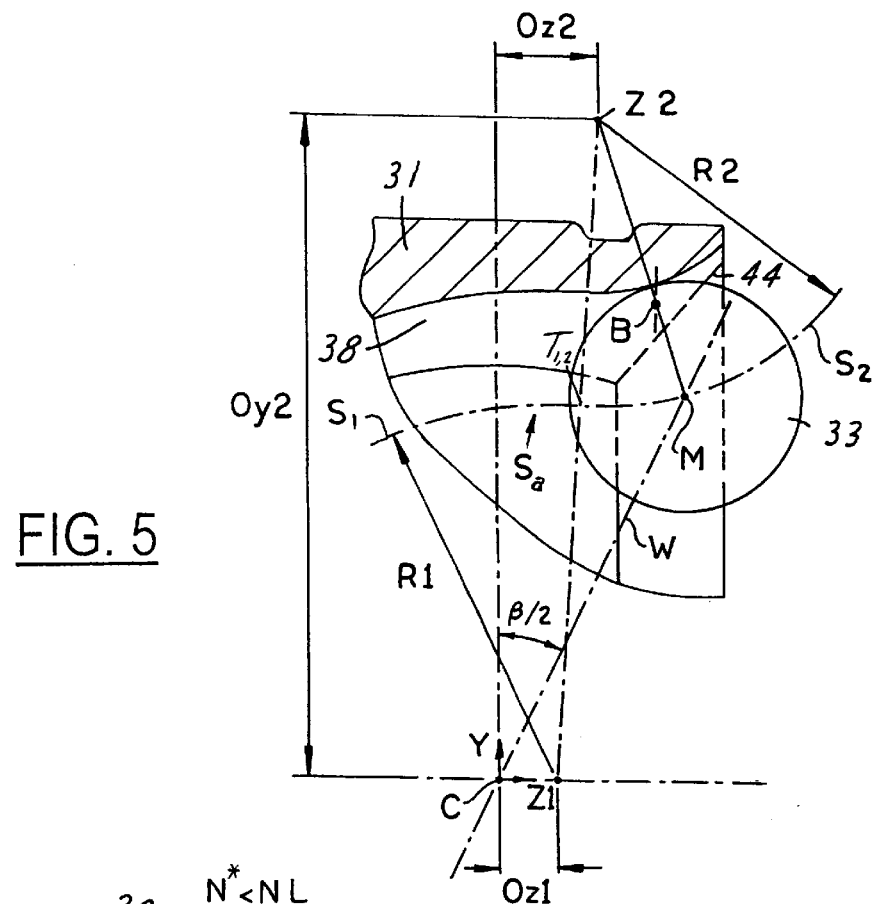
FIG. 5 shows a track run-out of the outer joint part of the joint according to FIG. 4.

FIG. 5 shows the outer joint part 31 with the outer ball tracks 38 in a broken away manner. It is possible to see said inner cone 44 which cuts off the outer track base 38 at the open end 38. Furthermore, the ball 33 of the ball track 38 is shown in the position which it assumes when the inner joint part is articulated relative to the outer joint part by the unchanged joint articulation angle β. The joint articulation angle β between the axes, which will be referred to below, leads to an articulation angle of the cage relative to the outer joint part of β/2 which is shown in the drawing. With the central plane of the cage being articulated accordingly relative to the central joint plane E, the ball 33, too, is moved out of the central joint plane E by the angle β/2 into the angle bisecting plane W. The center M of the ball follows the dash-dotted central line $S_a$ of the outer ball track 38 which is defined by a first circular arc $S_1$ with the radius $R_1$ whose center $Z_1$ on the axis $A_A$ is offset by the offset $O_{z1}$ relative tot eh central joint plane E, and by an adjoining second circular arc $S_2$ with the radius $R_2$ which is less than the radius $R_1$ and whose center $Z_2$ on a straight line extending outside the joint at a distance $O_{Y2}$ from the longitudinal axis $A_A$ is offset by the offset $O_{Z2}$ relative to the central joint plane E. The first end portion $S_2$ of the center line $S_a$ continuously adjoins the inner portion $S_1$ of the center line $S_a$ in a turning point $T_{1,2}$ respectively. Tangents on the center line $S_a$ are axis-parallel in the respective turning points $T_{1,2}$. The inner portion $S_1$ of the ball tracks 38 in the outer joint part 31 extend by 10° beyond the central joint plane E towards the open end 37 of the outer joint part 31.

Figure 6:
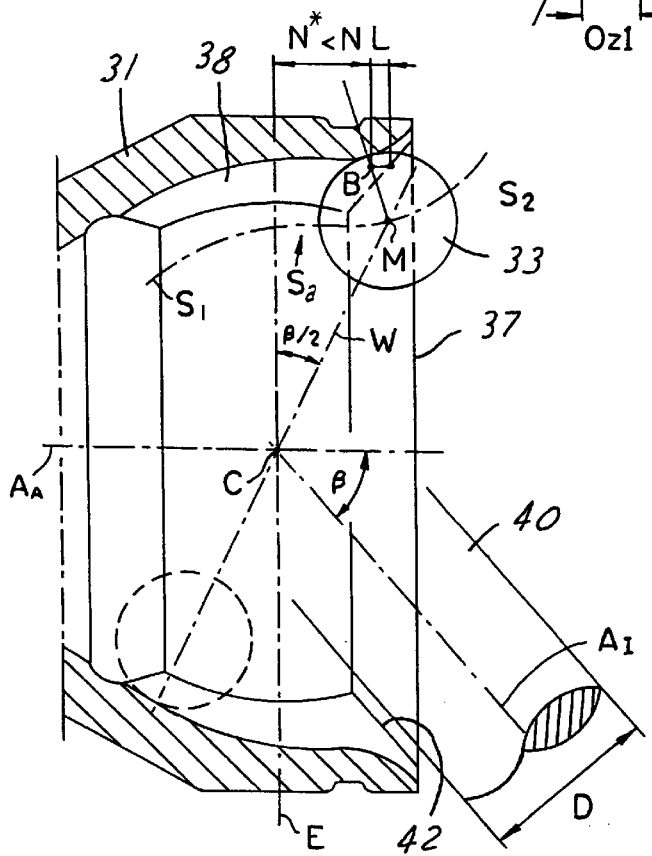
FIG. 6 shows the outer joint part of the joint according to FIG. 4 with an articulated connecting shaft.

With the articulation angle β assumed to be unchanged, the ball center M is slightly displaced towards the central joint plane E. On the other hand, the contact point B of the ball 33 at the outer ball track has moved behind the ball center M back to the central joint plane E and also radially outwards. As a result, the distance N* of the contact point B from the central joint plane becomes smaller as compared to the earlier distance N, as shown in FIG. 6. This means that by maintaining the minimum axial distance L of the contact point from the track and edge, the position of the inner cone 44 can be displaced towards the base 15, i.e. the outer joint part has been shortened.

FIG. 6 shows the above-mentioned joint articulation angle β between the axis $A_A$ of the outer joint part 31 and the axis $A_I$ of the inner joint part 32. In FIG. 6, the inner joint part is replaced by the connecting shaft 40 which, in this position, as already mentioned, is positioned at a distance from the inner cone 44 as a result of the displacement of the latter. In consquence, it becomes possible, without changing the articulation angle β, to increase the thickness of the connecting shaft 40 in order to increase the torque transmitting capacity. If, in deviating from the illustration, the position of the inner cone is slightly changed while retaining the thickness of the connecting shaft, and while maintaining an adequate safety distance L of the contact point B from the end of the ball track, the articulation angle β can be increased.

Constant Velocity Universal Joint

List of Reference Numbers
11, 31 outer joint part
12, 32 inner joint part
13, 33 ball
14, 34 ball cage
15, 35 base
16, 36 joint journal
17, 37 joint aperture
18, 38 outer ball track
19, 39 inner aperture
20, 40 connecting shaft
21, 41 securing ring
23, 43 cage window
24, 44 inner cone

What is claimed is:

1. A constant velocity universal joint for transmitting torque comprising:
   an outer joint part (31) with outer ball tracks (38) the outer joint part having a base end (35) closed by a base and an open end (37) defined by an aperture;
   an inner joint part (32) with inner ball tracks (42);
   torque transmitting balls (33) guided by pairs of outer and inner ball tracks (38, 42) positioned in corresponding meridian planes; and
   a ball cage (34) which lodges the balls (33) in circumferentially distributed windows (43) and holds the balls in a common plane and guides the balls onto an angle-bisecting plane (W) when the joint is articulated, with the outer and inner ball tracks (38, 42) having center lines composed of at least two differently curved portions ($S_a$, $S_i$) adjoining one another, with the center lines of the outer and inner ball tracks (38, 42) intersecting one another in the center of each ball and being symmetric relative to one another with reference to a central joint plane (E), wherein the center lines ($S_a$) of the ball tracks (38) of the outer joint part (31) each comprise convexly curved inner portions ($S_1$) and, towards the open end (37), oppositely curved concave first end portions ($S_2$) and that the center lines ($S_i$) of the ball tracks (42) of the inner joint part (32) each comprise convexly curved outer portions and, towards the base end (35) of the outer joint part (31), oppositely curved, concave second end portions.

2. A constant velocity universal joint according to claim 1, wherein the first end portions ($S_2$) of the center lines ($S_a$) of the ball tracks (38) of the outer joint part (31) continuously adjoin the inner portions ($S_1$) of the center lines ($S_a$).

3. A constant velocity universal joint according to claim 1, wherein the first end portions ($S_2$) of the center lines ($S_a$) of the ball tracks (38) of the outer joint part (31) adjoin the inner portions ($S_1$) of the center lines ($S_a$) in a turning point (T).

4. A constant velocity universal joint according to claim 1, wherein tangents on the center lines ($S_a$) are axis-parallel at respective turning points (T).

5. A constant velocity universal joint according to claim 1, wherein the first end portions ($S_2$) and inner portions ($S_1$) of the center lines ($S_a$) of the ball tracks (38) of the outer joint part (31) are circular arcs.

6. A constant velocity universal joint according to claim 1, wherein a radius of curvature ($R_2$) of the first end portions ($S_2$) is less than a radius of curvature ($R_1$) of the inner portions ($S_1$) of the center lines ($S_a$) of the ball tracks (38) of the outer joint part (31).

7. A constant velocity universal joint according to claim 1, wherein the inner portions ($S_1$) of the ball tracks ( 38) in the outer joint part (31) extend by 10° beyond the central joint plane (E) towards the open end (37) of the outer joint part (31).

8. A constant velocity universal joint for transmitting torque comprising:
   an outer joint part (31) with outer ball tracks (38) the outer joint part having a base end (35) closed by a base and an open end (37) defined by an aperture;
   an inner joint part (32) with inner ball tracks (42);
   torque transmitting balls (33) guided by pairs of outer and inner ball tracks (38, 42) positioned in corresponding meridian planes; and
   a ball cage (34) which lodges the balls (33) in circumferentially distributed windows (43) and holds the balls in a common plane and guides the balls onto an angle-bisecting plane (W) when the joint is articulated, with the outer and inner ball tracks (38, 42) having center lines composed of at least two differently curved portions ($S_a$, $S_i$) adjoining one another, with the center lines of the outer and inner ball tracks (38, 42) intersecting one another in the center of each ball and being symmetric relative to one another with reference to a central joint plane (E), wherein the center lines ($S_a$) of the ball tracks (38) of the outer joint part (31) each comprise curved inner portions ($S_1$) and, towards the open end (37), oppositely curved first end portions ($S_2$) and that the center lines ($S_i$) of the ball tracks (42) of the inner joint part (32) each comprise curved outer portions and, towards the base end (35) of the outer joint part (31), oppositely curved, second end portions, wherein the inner portions ($S_1$) and the outer portions each extend in a curved way around a center inside the outer joint part (31).

9. A constant velocity universal joint according to claim 8, herein the first end portions ($S_2$) and the second end portions each extend in a cured way around a center ($Z_2$) outside the outer joint part (31).

* * * * *

UNITED STATES PATENT AND TRADEMARK OFFICE
CERTIFICATE OF CORRECTION

PATENT NO. : 6,319,133 B1
DATED : November 20, 2001
INVENTOR(S) : Schwarzler et al.

It is certified that error appears in the above-identified patent and that said Letters Patent is hereby corrected as shown below:

Column 7,
Line 4, pelase change the word "herein" to -- wherein --.

Column 8,
Line 1, please change the word "cured" to -- curved --.

Signed and Sealed this

Eleventh Day of June, 2002

*Attest:*

*Attesting Officer*

JAMES E. ROGAN
*Director of the United States Patent and Trademark Office*